United States Patent
Marolia et al.

(10) Patent No.: US 7,480,907 B1
(45) Date of Patent: Jan. 20, 2009

(54) MOBILE SERVICES NETWORK FOR UPDATE OF FIRMWARE/SOFTWARE IN MOBILE HANDSETS

(75) Inventors: Sunil Marolia, Dana Point, CA (US); Teck Chia, Aliso Viejo, CA (US); John D. V. Dinh, Poway, CA (US); Vincent P. Soberano, Rancho Santa Margarita, CA (US); Glenn Hamasaki, Jr., Aliso Viejo, CA (US); James P. Gustafson, Irvine, CA (US); Toni Pakarinen, Ladera Ranch, CA (US); Sidney A. Jacobi, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 311 days.

(21) Appl. No.: 10/754,313

(22) Filed: Jan. 9, 2004
(Under 37 CFR 1.47)

Related U.S. Application Data

(60) Provisional application No. 60/438,900, filed on Jan. 9, 2003.

(51) Int. Cl.
*G06F 9/445* (2006.01)
(52) U.S. Cl. .................. 717/174; 717/127; 717/172
(58) Field of Classification Search .................. 717/172
See application file for complete search history.

(56) References Cited

U.S. PATENT DOCUMENTS

| | | | | |
|---|---|---|---|---|
| 5,261,055 A | 11/1993 | Moran et al. | ................. | 395/275 |
| 5,442,771 A | 8/1995 | Filepp et al. | ................. | 395/650 |
| 5,479,637 A | 12/1995 | Lisimaque et al. | .......... | 395/430 |
| 5,579,522 A | 11/1996 | Christeson et al. | .......... | 395/652 |
| 5,596,738 A | 1/1997 | Pope | ........................... | 395/430 |
| 5,598,534 A | 1/1997 | Haas | ...................... | 395/200.09 |
| 5,608,910 A | 3/1997 | Shimakura | .................. | 395/670 |
| 5,623,604 A | 4/1997 | Russell et al. | ............ | 395/200.1 |
| 5,666,293 A | 9/1997 | Metz et al. | ............... | 395/200.5 |
| 5,752,039 A | 5/1998 | Tanimura | ..................... | 395/712 |
| 5,778,440 A | 7/1998 | Yiu et al. | ..................... | 711/154 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Eric B Kiss
*Assistant Examiner*—Thuy Dao

(57) ABSTRACT

A mobile handset in a mobile services network, with access to a plurality of services, including a firmware/software update service, receives update notifications. The notifications indicate the availability of update packages, and, in response, the mobile handset confirms the authenticity of the received update notifications before initiating a download of an associated update package from a management server or delivery server in the mobile services network. The notifications may be managed and sent by an authorized user from a management console. One or more delivery servers may be employed to dispense update packages to a plurality of mobile handsets.

24 Claims, 3 Drawing Sheets

U.S. PATENT DOCUMENTS

| | | | | |
|---|---|---|---|---|
| 5,790,974 | A | 8/1998 | Tognazzini | 701/204 |
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,363,524 | B1 * | 3/2002 | Loy | 717/170 |
| 6,438,585 | B2 | 8/2002 | Mousseau et al. | 709/206 |
| 6,564,371 | B1 * | 5/2003 | Goldman et al. | 717/127 |
| 6,594,822 | B1 * | 7/2003 | Schweitz et al. | 717/140 |
| 7,089,549 | B2 * | 8/2006 | Venkiteswaran | 717/170 |
| 7,100,083 | B2 * | 8/2006 | Little et al. | 714/26 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2004/0205709 | A1 * | 10/2004 | Hiltgen et al. | 717/115 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE SERVICES NETWORK FOR UPDATE OF FIRMWARE/SOFTWARE IN MOBILE HANDSETS

RELATED APPLICATIONS

This patent application makes reference to, claims priority to and claims benefit from U.S. Provisional Patent Application Ser. No. 60/438,900, entitled "Mobile Services Network for Update of Firmware/Software in Mobile Handsets," filed on Jan. 9, 2003.

The complete subject matter of the above-referenced United States Provisional patent application is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems may arise when informing a mobile handset of a need to update its firmware or software. Also, it is necessary to determine whether a notification received by a mobile handset is authentic. It may be possible for an unauthorized and illegal software hacker to emulate a management server and send a notification to electronic devices such as, for example, mobile handsets, misleading them into retrieving an unauthorized and unauthentic update package. The need to authenticate update notifications is a significant issue.

Supporting the download of update packages by thousands of mobile handsets from an operator's network has proven problematic. Identifying the appropriate update package for a mobile handset has proven problematic as well.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that facilitates updating of firmware in an electronic device, using updating information, through a network, the system comprising a generator for generating updating information using two versions of the firmware; storage having database software for storing updating information; and a user interface at least for managing the generation, distribution, and storage of updating information. The electronic device comprises loader software for loading updating information from the storage; and updating software for applying loaded updating information to the firmware in the electronic device.

In an embodiment of the present invention, an authorized user uses the user interface device to manage the generated updating information. In an embodiment of the present invention, only an authorized user can load the generated updating information to the storage. In an embodiment of the present invention, a plurality of distinct updating information reside in the storage, and only an authorized user determines which one of the plurality of the distinct updating information is appropriate for the electronic device.

In an embodiment of the present invention, the generated updating information has an associated state which may be a state indicating the generated updating information is new; a state indicating the generated updating information is only available to an authorized user; a state indicating the generated updating information is available to be loaded by an electronic device; a state indicating the generated updating information is no longer valid; or a state indicating the generated updating information failed testing performed by an authorized user. The associated state of updating information can only be changed by an authorized user.

A method for the updating of firmware in at least one electronic device, using updating information, the method comprising generating updating information using two version of the firmware; storing the generated updating information; associating a state with the generated updating information; and communicating a notification to the at least one electronic device about the availability of updating information.

The method further comprises receiving a request for the updating information from the at least one electronic device; retrieving the updating information using at least one characteristic of the at least one electronic device; and verifying the retrieved updating information.

Upon verification, the method further comprises sending the updating information to the at least one electronic device. Upon successful completion of the updating of the software, the method further comprises receiving a notification from the at least one electronic device indicating the successful updating of the firmware in the at least one electronic device.

In an embodiment of the present invention, the network is a wireless network.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
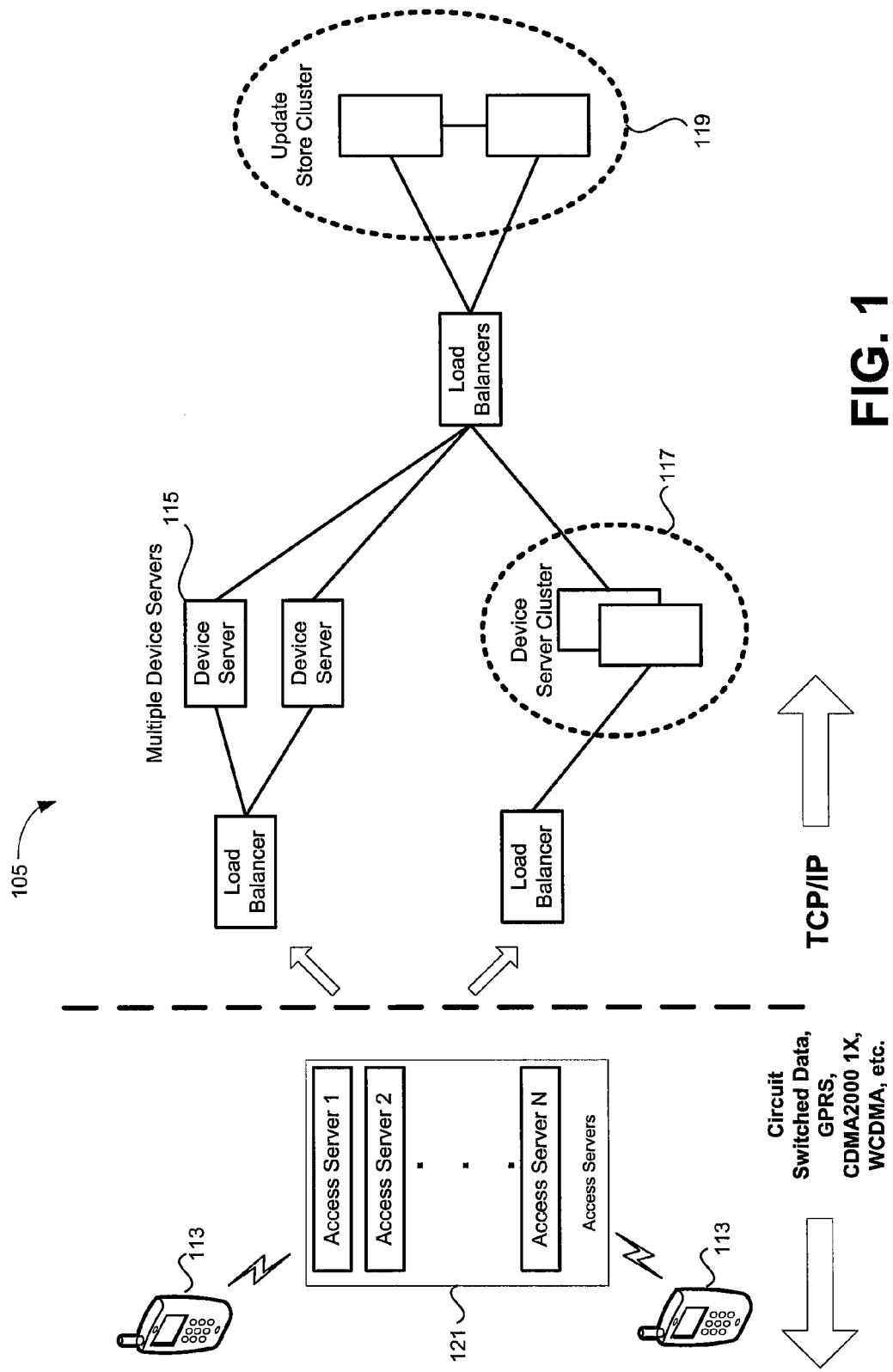
FIG. 1 illustrates a block diagram of an exemplary mobile services network, in accordance with an embodiment of the present invention.

The present invention relates generally to updates of firmware/software components in electronic devices such as, for example, mobile handsets, and specifically to the verification of received update notification, such as Short Message Service (SMS) message notifications, before the retrieval of update packages from a management server. Although the following discusses aspects of the invention in terms of a mobile handset, it should be clear that the following discussion also applies to other mobile electronic devices such as, for example, personal digital assistants (PDAs), pagers, personal computers (PCs), and similar handheld electronic devices.

An embodiment of the present invention may be utilized in mobile handsets for upgrading firmware/software, in a fault tolerant manner, and may require no hardware changes to the mobile handset. In an embodiment of the present invention, firmware/software updates may be performed utilizing over-the-air (OTA) solutions.

In an embodiment of the present invention, an updating system may comprise an update package generator, an update store, and an update agent. An update package may contain information needed to upgrade software/firmware from one version to another. The update store may be utilized for lifecycle management of update packages that may be created by the updating system and applied to the mobile handset to update its firmware/software. The update store may also be integrated with device servers in the network containing the mobile handset. In an embodiment of the present invention, the update store and a management console may handle management of update packages for specific groups and handsets.

In an embodiment of the present invention, the updating system may provide a management console, lifecycle management, and a mobile handset update agent. The management console may display a list of update packages available within each client mobile handset. In an embodiment of the present invention, the management console may be, for example, a Hypertext Markup Language—(HTML) based application hosted by the update store. The management console may be viewed using a browser on a machine with a routable address that can communicate with the update store. Activity events such as, for example, the nature and origin of the device server events or errors, may also be viewed using the management console.

In an embodiment of the present invention, the lifecycle management may manage the status and availability of update packages within the update store. In an embodiment of the present invention, the lifecycle management may also determine which update packages may be accessed by subscribers, which update packages may still need to be tested, and which update packages may be rejected or inactive. In an embodiment of the present invention, the lifecycle management may be utilized to add, delete, change status of, or modify the details of an update package. The lifecycle management may also be utilized to view the transaction history of update packages.

In an embodiment of the present invention, the mobile handset update agent may allow auto detection of and compatibility with various flash memory chips. An operator may, as a result, switch flash memory chips without the need to redesign and recompile the firmware, since the update agent may detect the flash memory chip in the mobile handset and use an appropriate driver. In an embodiment of the present invention, the update agent may be compatible with several initialization processes, including processes such as, for example, bus initialization, access to watchdog registers, flash enable, write protect off, initialization of CPU clock, user interface initialization, and multiple chip-multiple initialization processes.

In an embodiment of the present invention, the mobile handset update agent may provide wrapper functions, which may allow or prevent the update agent from updating the firmware based on the battery level of the mobile handset. The handset update agent may also be compatible with platforms, having security mechanisms designed to disable the mobile handset in case of unauthorized tampering.

In an embodiment of the present invention, the mobile handset update agent may be configured to accommodate different devices with different watchdog periods. In another embodiment of the present invention, the update agent may be configured to be compatible with devices having different watchdog periods in one device.

In an embodiment of the present invention, the update agent may contain a built in memory management functionality to remain self-contained during the update process. As a result, the update agent may not need to rely on any run-time libraries, and may access and update firmware regardless of interruptions.

In an embodiment of the present invention, the update system may support activity event reporting for subscribers, administrators, and system and update package transactions. An administrator may be able to view a log of all activities and transactions of the system. The activities and transactions may include, for example, update package management activities, enabling/disabling of a mobile handset server, provisioning activities of a device server, update queries from a device server, update package transfers to a device server, or update package downloads to a mobile handset agent.

In an embodiment of the present invention, the generator and associated update agent may utilize Extensible Markup Language—(XML) based framework for uploading update packages into the management server, and during the download process. Service interfaces related to the insertion or uploading of update packages may assume that an update package may be packaged in a predefined XML schema. In an embodiment of the present invention, a set of web-based management console screens may provide a user-friendly interface to select an update package file and call a relevant update store service interface to apply the update package.

In an embodiment of the present invention, the update store and management console may be modular such that they may be integrated into an existing delivery server. Therefore, if a system operator has existing infrastructure to deliver data, the update system may extend the existing system by enabling the lifecycle management functionality to manage deployment of firmware updates. In an embodiment of the present invention, the external service interfaces, provided by the update store, may be exposed as standards-based web services. The external interfaces may be described using, for example, Web Services Description Language (WSDL), and accessed, for example, via Simple Object Access Protocol (SOAP) over Hyper Text Transfer Protocol (HTTP).

In an embodiment of the present invention, the server may comprise an update store and a device server. The update store may respond to requests for update packages and may also host a web-based management console application to manage update packages. The device server may negotiate and deliver update packages to the device clients such as, for example, a mobile handset. In an embodiment of the present invention, the update store and the device server may interface with one another via SOAP over HTTP in a TCP/IP network, for example. In an embodiment of the present invention, the device server may be configured to communicate with any update store in the network.

FIG. 1 illustrates a block diagram of an exemplary mobile services network 105, in accordance with an embodiment of the present invention. The mobile services network 105 may comprise multiple device servers 115 and 117 on the server side. The device servers 115 and 117 may handle multiple simultaneous accesses from mobile handsets 113 through access servers 121.

In an embodiment of the present invention, the device servers 115 and 117, and the update store cluster 119, may be responsible for lifecycle management and deployment of update packages. The update store cluster 119 may support database and file management capabilities. An administrator may load update packages from the management console onto the update store cluster 119, where the update packages are stored in a database. In an embodiment of the present invention, the administrator may have an option to load one or more update packages facilitated by XML-formatted update packages. The update store cluster 119 may support an Application Program Interface (API) to a management console that provides a list of update packages and associated information meeting the administrator's specified selection criteria. In an embodiment of the present invention, the update store cluster 119 may allow the administrator to replace an existing update package in the update store cluster 119 with another update package and delete an existing version. Following deletion of the existing version, the update package may be listed in a history table. Update packages may be stored in a hierarchical structure based on an update store schema.

In an embodiment of the present invention, when new update packages are generated and later uploaded into the update store cluster 119, the administrator may control which update packages are approved for access by subscribers, which update packages still need to be tested, and which update packages are inactive or should be rejected.

In an embodiment of the present invention, the update store cluster 119 may allow the administrator to specify the lifecycle state of an update package using several states such as, for example, "new," "testing," "approved," "inactive," and "rejected." "New" may be the state of an update package which may have been loaded into the update store cluster 119, but for which testing resources may have not been allocated. Subscribers may not be allowed to download an update package in the "new" state. "Testing" may be the state of an update package, which is only available to testing personnel, and may require a unique identifier on the device used for testing. "Approved" may indicate that an update package has been approved after testing and may be made available to all subscribers. In an embodiment of the present invention, there may be only one update package per source firmware version that may be approved for a given model of a mobile handset. Older versions of the source firmware may be marked "inactive." In an embodiment of the present invention, an update package may not pass testing, and may be assigned the "rejected" state. Subscribers may not be allowed to download a rejected update packages.

In an embodiment of the present invention, components of the updating system may be used as an extension to existing infrastructures such as, for example, using the Internet over the air (IOTA) standard as a delivery mechanism for the update packages, and reusing an existing standards-based download client on the mobile handset.

Figure 2:
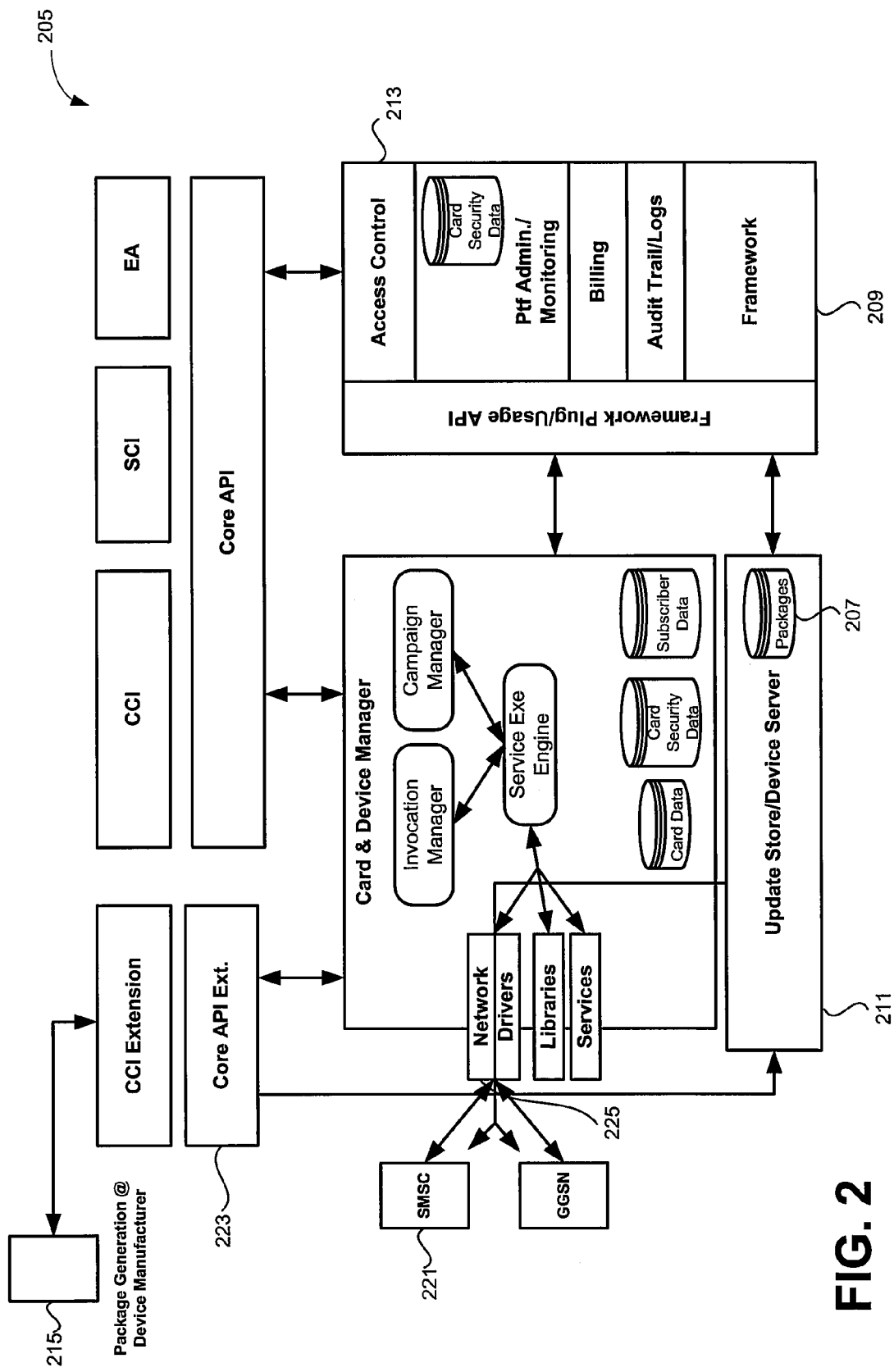
FIG. 2 illustrates a block diagram of an exemplary updating system with a device server and update store integrated into an existing framework, in accordance with an embodiment of the present invention.

FIG. 2 illustrates a block diagram of an exemplary updating system 205 with an update store/device server 211 integrated into an existing framework 209, in accordance with an embodiment of the present invention. In an embodiment of the present invention, the update store/device server 211 may be integrated into an existing framework 209 such as, for example, the GemXplore Suite (GXS) framework from GemPlus, to provide a full device software update (DSU) management functionality. In an embodiment of the present invention, the integration of the update store/device server 211 in an existing framework may be utilized to facilitate billing and other transactions.

In an embodiment of the present invention, the interface points of the updating system may reside as formatted data, which may be pulled into required customer care and billing systems. In another embodiment of the present invention, wherein the updating system may be integrated into an existing framework 209, the interface points of the updating system may be developed to provide open APIs, such that the update store/device server 211 may interface with the APIs to generate billing and transactional data in the existing framework 209.

In an embodiment of the present invention, an updating system integrated with an existing framework 209 may provide a set of interfaces used to execute platform services, and administer and control the platform. The update package input interface may remain separate from or remain a part of the set of interfaces of the existing framework 209, depending on the system's requirements.

In an embodiment of the present invention, components responsible for update package storage and delivery may be integrated within an existing framework 209 to reuse common features such as, for example, access control 213, administration, monitoring, billing, and audit logs. The components may also be accessed through extensions of a core API 223 associated with the existing framework 209.

In an embodiment of the present invention, an updating system integrated with an existing framework 209 may allow extending a current subscriber database containing information such as, for example, phone number, subscriber identifier IMSI (International Mobile Station Identifier), and handset identifier IMEI (International Mobil Equipment Identity), to also track software/firmware updates performed on subscribers' mobile handsets.

In an embodiment of the present invention, an updating system integrated with an existing framework 209 may communicate with a mobile handset through the network drivers 225 of the OTA platform associated with the existing framework 209. Update packages 207 may be downloaded to a mobile handset using the data network driver of the network drivers 225. In an embodiment of the present invention, notifications associated with the updating system may be handled through a short message service (SMS) network driver of the network drivers 225.

In an embodiment of the present invention, the updating system may utilize "remote trigger" for push-type operations. In an embodiment of the present invention, the updating system may utilize infrastructure of the existing framework 209 to provide remote notification of devices requiring firmware updates. The integrated system 205 may allow using a single interface to control universal subscriber identity module (USIM) and device management activities.

In an embodiment of the present invention, when a new firmware version is released and an update package is created, an authorized administrator logged into the system may upload the new update package through the updating system's management console. The administrator may browse to an appropriate update package and upload that file. The update store/device server 211 may then parse the XML metadata and add the update package into the update store database categorized according to the metadata provided in the update package.

In an embodiment of the present invention, the default state for an update package may be "new" when it is first uploaded. The update package may not be available for download by mobile handset until the state changes to the "approved" state. In an embodiment of the present invention, an administrator may use the management console to specify the update package and to change the state to "approved." Once in the "approved" state, the update package may be available to qualifying mobile handsets.

In an embodiment of the present invention, an administrator may use a customer care console of the existing framework to choose the subscribers who may receive "push" updates. An OTA server of the existing framework may utilize a SMS channel (SMSC) 221 to send notification to the selected users, triggering the download agents of the updating system on the subscribers' mobile handsets. The notification received by a subscriber may contain information regarding the firmware update such as, for example, bug fixes, feature enhancements, pricings, approximate update time, etc. In an embodiment of the present invention, the subscriber may be prompted whether or not to accept the update, and may then select "accept" to begin an update process.

In an embodiment of the present invention, the download agent of the mobile handset may establish a Secure Socket Layer (SSL) connection to the update store/device server 211. The download agent may provide the device server with profile information about the mobile handset, including such things as, for example, manufacturer, model, firmware version, and unique device identification in an appropriate data format such as, for example, XML format. The update store/device server 211 may then parse the metadata and provide the parameters to the update store/device server 211 to match the parameters to available update packages. Upon identification of an available update package, the update store/device server 211 may respond with validation information about the update package. The download agent may use this information to perform an initial validation of the update package. If validation is successful, the download agent may respond with a request for the update package, which the update store/device server 211 may send to the mobile handset.

Once the update is completed, the download agent may generate a mobile handset initiated SMS using the SMSC 221 of the existing framework to indicate that the mobile handset had been successfully updated. The information may then be logged in the subscriber's database for access through the customer care console.

In an embodiment of the present invention, notifications and updating information may be delivered using OTA communications. For an OTA communication of information and data, the download agent of the mobile handset may be initiated through several means including, for example, a menu item, a remote trigger, or a service code. The download agent may initiate contact with a device server in the updating system. This may be done through the OTA data channel available for the network and the mobile handset. The mobile handset may send an XML-based header to the device server. The header may include metadata about the mobile handset such as, for example, manufacturer, model, and firmware version. Based on the metadata, the update store/device server 211 may provide information regarding the availability of an update package. The download agent may then accept an update package, which may be delivered via HTTP using a communication protocol such as, for example, TCP/IP. When the update package is downloaded and verified, the update agent in the mobile handset may apply the updates in a fault-tolerant manner.

In an embodiment of the present invention, notifications and updating information may be delivered via a point of sale terminal (POS). Updating of a mobile handset from a POS terminal may occur in several ways, depending on the requirements. In an embodiment of the present invention, the POS terminal may utilize substantially the same system as the OTA means, described hereinabove, to pull updates from the update store/device server 211 through a wireless network to the mobile handset. In another embodiment of the present invention, the OTA network may be replaced with a wired network by installing a remote access server as a gateway to the update store/device server 211. The update process may then be activated from a directly connected mobile handset via a service code or special "test" menu. Once the updating process starts, it may be substantially identical to the OTA method, and the mobile handset may manage its own update.

In an embodiment of the present invention, each component of the updating system may be extended independently of the other components to allow customization based on the requirements of a specific network in which the updating system may be utilized.

In an embodiment of the present invention, the updating system may provide a management interface, which may provide access to components of the update store/device server 211, manage access to update packages, and manage the logging of activities. The management interface may also support lifecycle management of update packages. In an embodiment of the present invention, the management interface may employ security mechanisms such as, for example, password-based authentication of users with access to server-side resources. These resources may be provisioned by an access control list. In an embodiment of the present invention, the system may utilize a secure sockets layer (SSL) client-authentication based remote access to the management interface. In yet another embodiment of the present invention, the system may utilize a lightweight directory access protocol (LDAP)-based security mechanism for security.

In an embodiment of the present invention, update packages may incorporate Cyclic Redundancy Code (CRC) values for integrity protection. For authentication of an originator of the update packages, for example, the manufacturer, and for additional integrity protection, an update package collection may be digitally signed, for example, using information such as a Message Digest algorithm 5 (MD5) checksum or a Rivest/Shamir/Adleman (RSA)-MD5-Digital Encryption Standard (DES) security algorithm-based DES checksum, which may be verified using the management interface before incorporating the update package collection in the update store/device server 211.

In an embodiment of the present invention, access control may be provided via the management interface and provisioned using an access control list. Prevention of use of a resource by unauthorized entities may be achieved using objects such as, for example, an administrator object, a roles object, a folders object, and other objects. In an embodiment of the present invention, the management interface may provide an administrator object, which may represent the administrator of the server-side system. The administrator object may store the attributes of an administrator. The administrator object may be used for access authentication and access control to update packages via the role object. In an embodiment of the present invention, the role object may encapsulate the access control information, which may be stored in an administrator object. The default access permission may be "Read"

and "Write" permissible for each new folder for all roles, until specified otherwise by the main administrator. Additionally, an access control table may store access control values (read, write) for each folder (manufacturer, carrier, device model), which may be specified for each object in the system.

In an embodiment of the present invention, an XML query sent by a client device may incorporate client device authentication information, in a format appropriate to the specific server environment. The server-side system may be responsible for authenticating the client device and providing an appropriate response or content.

In an embodiment of the present invention, administrators may enter a user name and password to access the management console, in order to provide the security of an authenticated session. After a certain period of management console inactivity, the authenticated session may expire. Authentication for access to managed objects via a Simple Network Management Protocol (SNMP) may be provided by a firewall or other network security mechanisms. Passwords and critical SNMP commands may be passed over the public network and may be encrypted to ensure data privacy over the network where snooping may occur. Passwords may be displayed with '*' characters to ensure data privacy on monitor screens for "look over the shoulder" snooping.

In an embodiment of the present invention, encryption of an entire update package may be provided employing appropriate techniques such as, for example, RSA.

In an embodiment of the present invention, for administrative tasks on the update store/device server 211 such as, for example, uploading an update package, the update store/device server 211 may support public key interface (PKI) to enforce secure sockets layer (SSL). The system may use a certificate servlet to generate a public key, a private key, and a certificate request that contains the system's public key. To obtain a certificate, the system may send the certificate request to a certificate authority (CA) and obtain a signed certificate. When a client requests an SSL connection, the device server may present its certificate for the client device (i.e. mobile handset) to evaluate, and the client device may accept the certificate and proceed to form a secure connection. In an embodiment of the present invention, a two-way authentication may be set up for administrative tasks.

In an embodiment of the present invention, when multiple versions of an update package exist, the update system may update the mobile handset directly from the oldest version to the newest version without performing updating to the multiple intermediate versions first. This may be done through lifecycle management of the update packages via the management console. The update package generator may create all intermediate versions of the update packages, including those that may be skipped. When the update packages are uploaded to the update store/device server 211, an administrator may change the state of the desired update package to "approved." When a mobile handset with the oldest version requests an update, the update store/device server 211 may respond with an "approved" update package that skips over the intermediate versions. In an embodiment of the present invention, an old or source version of software/firmware may only have one target version, so all the intermediate versions may be changed to an "inactive" state, and thus may not be downloaded by a mobile handset. In an embodiment of the present invention, an update package of a previous or older version of the firmware may replace a newer version, if so desired.

In an embodiment of the present invention, when several versions of firmware exist, the update package generator may create update packages for each possible forward permutation of updates. For example, if there are four versions of firmware in the generator, the generator may create updates for version 1 to version 2, version 1 to version 3, version 1 to version 4, version 2 to version 3, version 2 to version 4, and version 3 to version 4. All update packages may then be packaged in a single format, and may be uploaded to the update store/device server 211. The update store/device server 211 may then catalog each update package and set each at the "new" state. When the update packages are uploaded, the administrator may set the state of the packages to an "approved" state for distribution. For each mobile handset, the appropriate update package may then be retrieved for the updating process.

In an embodiment of the present invention, when an update package is uploaded to the update store/device server 211, the update store/device server 211 may verify certain metadata of the update package. The update store/device server 211 may check that the size specified in the metadata of the update package matches the size of the update package. Also, the update store/device server 211 may check that the CRC value in the metadata of the update package matches the CRC calculated from the binary data of the update package.

In an embodiment of the present invention, the update store/device server 211 may contain update packages and associated metadata, administrator data for access to a management console, an alarm log, and an activity log. The metadata for an update package may comprise mobile handset manufacturer, model, firmware version, and a unique identification.

In an embodiment of the present invention, the update store/device server 211 may interface with a third party delivery server via a transfer protocol such as, for example, HTTP. This may enable the updating system to reuse an existing delivery infrastructure, while adding update package lifecycle management capabilities.

Figure 3:
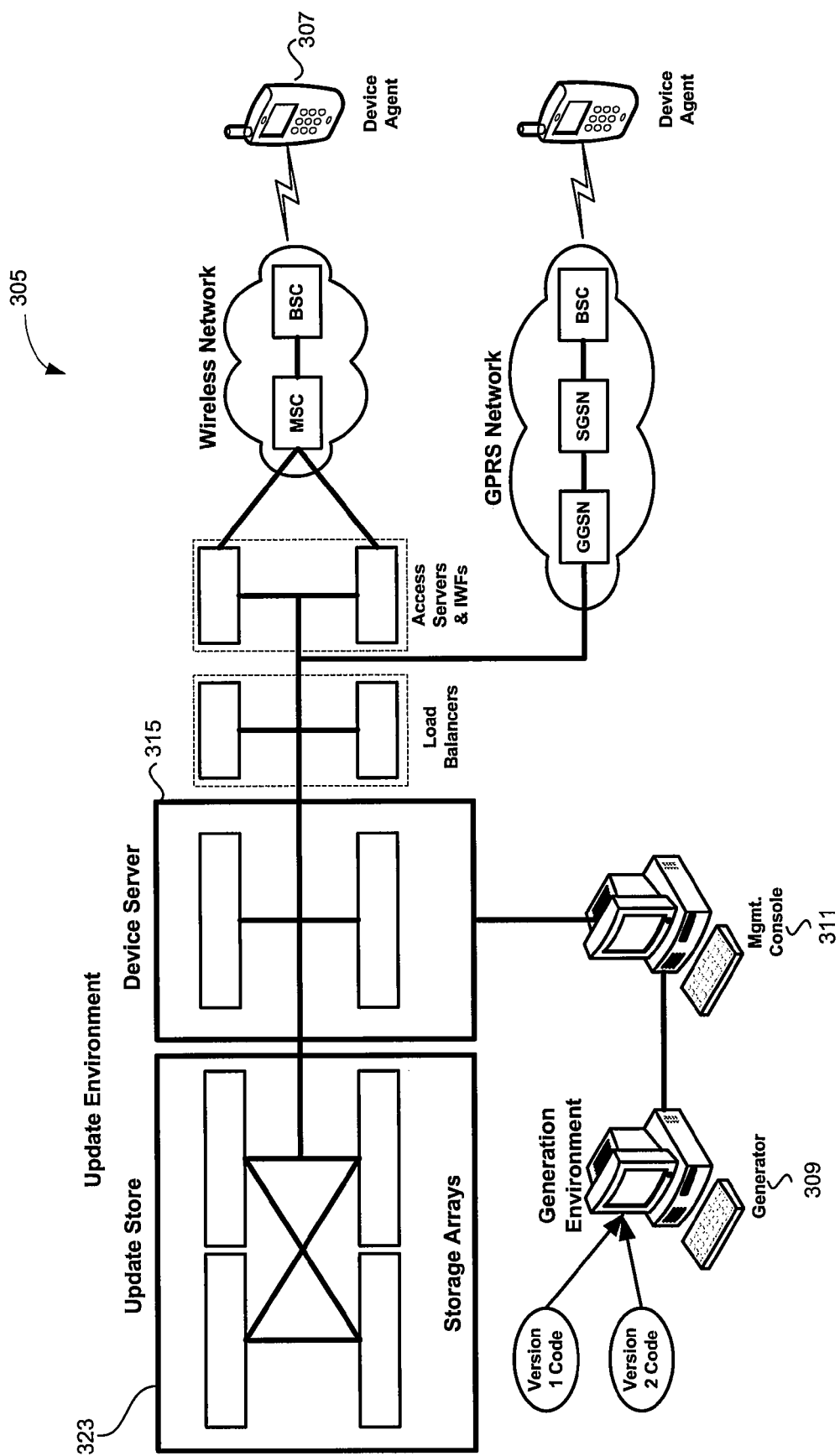
FIG. 3 illustrates a block diagram of an exemplary update environment, in accordance with an embodiment of the present invention.

FIG. 3 illustrates a block diagram of an exemplary update environment 305, in accordance with an embodiment of the present invention. In an embodiment of the present invention, the update environment 305 may comprise an update store 323, device servers 315, a generator 309, a management console 311, and a plurality of mobile handsets 307 with an embedded device agent.

In an embodiment of the present invention, the generator 309 may create update packages, which may be formatted with a header consistent with a data format such as, for example, XML. The header may comprise metadata describing the created update packages with information such as, for example, the manufacturer, model, and version. In an embodiment of the present invention, the header may comprise additional parameters as required by the system. The header may also be used for uploading and cataloging the created update package into the update store 323.

In an embodiment of the present invention, a device agent in a mobile handset 307 may use the header, during the update package request. The device server 315 may parse the metadata, and an appropriate update package may be identified and delivered to the mobile handset 307 based on the content of the metadata.

In an embodiment of the present invention, the device agent in a mobile handset 307 may comprise an update agent and a download agent. The download agent may utilize existing communication stacks of the mobile handset 307 to deliver an update package to the mobile handset 307. In an embodiment of the present invention, the update agent may work in conjunction with the download agent to complete the updating process. In another embodiment of the present invention, the update agent may utilize a download agent that may already exist on the mobile handset 307.

In an embodiment of the present invention, the generator 309 may build update packages utilizing algorithms that use compression technologies and byte-level analysis of sequentially versioned binary firmware images. In an embodiment of the present invention, the generator 309 may create update packages with a reduced size to accommodate OTA transmission and low-memory requirements. The generator 309 may also utilize optimizing algorithms for minimizing the size of update packages.

In an embodiment of the present invention, the device server 315 and the update store 323 may control the deployment and management of update packages. The update store 323 may interact with the device agent embedded in the mobile handset 307, and determine the appropriate update package for the mobile handset based on the handset's hardware and software profiles. In an embodiment of the present invention, the device agent may be responsible for controlling the entire updating process. The update store 323 and the device server 315 may correspond the update store/device server 211 of FIG. 2.

In an embodiment of the present invention, changes to software in the mobile handset 307 may not affect the ability to create and apply updates to the mobile handset 307. In another embodiment of the present invention, in a mobile handset 307 that employs dynamic memory allocation for storing content, appropriate memory management functionality may be employed by the update agent in the mobile handset 307 to locate the update package during the update process. In an embodiment of the present invention, a fixed area of the flash memory of the mobile handset 307 may be allocated for the storage of update packages.

In an embodiment of the present invention, the updating system may include a flash library feature, which may be compiled into the update agent. The flash library feature may enable several drivers to be integrated with the mobile handset 307, such that the update agent can auto-detect installed flash memory chips and utilize the appropriate driver to access the flash memory devices that are available. Consequentially, changes to flash memory hardware in the mobile handset do not affect the system's ability to create and apply updates to software/firmware in the mobile handset 307.

In an embodiment of the present invention, the generator algorithms and update agent may produce an exact replication of the new software/firmware version in the mobile handset. The update agent may run independently of the code being updated and may modify the code such that the update firmware matches the target version at the byte level. In an embodiment of the present invention, a series of CRCs may be verified during the update process. In an embodiment of the present invention, the metadata sent from a device server such as, for example, device server 315, may include CRCs calculated from the source firmware image, and CRCs calculated from the target firmware image. The download agent in the mobile handset 307 may verify that the CRC of the source firmware image match the CRC of the firmware image currently in the memory of the mobile handset 307. If it does not, the update package will not be downloaded. If, on the other hand, the downloaded metadata CRC matches that of the firmware image currently in the mobile handset, the download agent may request the update package from the device server. When the update package is downloaded to the mobile handset, the download agent may calculate a CRC on it and verify that it matches a previously sent CRC from the device server. If the CRC matches, the download agent may commit the update package to flash memory, write a status flag to flash memory to indicate the availability of the update package, and reboot the mobile handset. After rebooting, the update agent may begin to update the firmware using the update package. After updating each block of flash memory, the update agent may verify that the CRC of the resulting block matches the target image CRC sent by the server. In an embodiment of the present invention, there may be a power loss during the update process, in which case, the update agent may continue with the update process after power is restored. In an embodiment of the present invention, there may be a hardware failure during the update process, in which case, the update agent may re-try a set number of attempts to continue the update process. In another embodiment of the present invention, in the case of a hardware failure, the update agent may display an error message to an end user of the mobile handset In an embodiment of the present invention, the download agent may download metadata describing an update package before downloading the update package itself. The metadata may include attributes of the update package, attributes of the device for which the update package is intended, and detailed attributes of the source and target versions of firmware. The detailed attributes may include CRCs of the objects with which they are associated, as well as data fields. Additionally, the download agent of the mobile handset may have a wrapper function that may allow the checking of the battery level of the mobile handset prior to the start of the update process.

In an embodiment of the present invention, the update process may be authenticated utilizing several types of validation. One type of validation may check the update packages by authentication of the source of an update package; ensuring an update package is appropriate for the mobile handset; and validating that an update package was correctly downloaded to memory. In an embodiment of the present invention, the update agent in the mobile handset may perform the validation of the update package. In another embodiment of the present invention, the update agent in the mobile handset may perform the validation of the update package on a block-by-block basis, where a check may be performed on each updated block.

Another type of validation may be done by the download agent to check a hand-off of an update package from the download agent to the update agent by the download agent committing an update package from memory such as, for example, Random Access Memory (RAM), to flash memory. The download agent may then check the CRC of an update package just stored in flash to determine whether it matches the CRC of the update package downloaded to memory. The download agent may then append the CRC of a first set number N of bytes of update flag and append the CRC to the flag before writing all the bytes to a predetermined location in flash memory known to the update agent The update agent may then check for the update status flag, and if the flag is in a non-idle mode, the update agent calculates a CRC from the first N bytes of the flag and compares it with the CRC appended to the flag by the download agent.

Yet another type of validation may be done by the update agent prior to re-flash process. The update agent of the mobile handset may authenticate the source of the update package using methods such as, for example, hash/signature method. The update agent may then verify that the update package is appropriate for the mobile handset, by matching manufacturer, model, firmware version, and CRCs of the source (existing) firmware version. The CRC verification may indicate that the source firmware version, contained in each block of flash memory, matches the flash memory blocks described by the metadata. The update agent may then verify that the update package was correctly stored and flash memory and was not corrupted during the write process. This may also be done utilizing CRCs similar to the validation methods utilized by the download agent.

Another type of validation may be done by the update agent during the re-flash process, for fault tolerance, where each block of flash memory is updated in RAM then copied to a working block in flash memory. The block may then be copied to the source (original) block in flash memory, thereby completing the updating process. The validation begins when the update agent copies a block that need updating into RAM, then verifies through a CRC that the copy in RAM matches the source in flash memory. After using the information from the update package to update the RAM copy of the flash memory block, the update agent verifies, also using a CRC, that the updated version of the block in RAM matched the CRC of the expected target (new) block. The CRC of the expected target block is contained in the metadata in the update package, which may be also validated as upon download and commit to flash memory. When the updated version of the block in RAM is validated, the update agent writes this block to a working block in flash memory. The update agent may then copy the update block in RAM to the flash memory location where the original source block was located.

Still another type of validation may be done by the update agent after the re-flash process. After updating the firmware, the update agent may modify the update status flag to indicate successful completion of the update process. The update agent may calculate a new CRC value for the flag, based on the first N bytes, and append the new CRC value to the flag. The update agent may then commit the new flag to flash memory in the original location, and the update agent may reboot the mobile handset. The new flag associated with the new version of firmware will be used in future updating process as described hereinabove.

In an embodiment of the present invention, a manufacturer may release a new firmware version. The user of generator 309 may input the new version of firmware into the generator 309. Associated with the new firmware version, the user may also designate a block of memory used for validation information of the firmware that may be used to check CRCs to validate an image of the firmware prior to overwriting firmware in a mobile handset. The generator 309 may then create update packages containing metadata utilized to upload and catalog the update packages into the update store 323.

In an embodiment of the present invention, the firmware version may be the first one, in which case, the user may set appropriate information to indicate so. In an embodiment of the present invention, the generator 309 may include an option to use a preprocessor to reduce the size of an update package. In an embodiment of the present invention, the user may also choose to create a specific update package, or to create all update packages associated with a particular firmware, when several versions of the firmware exist.

In an embodiment of the present invention, a system administrator may utilize the management console 311 to log into the update store 323, to locate an appropriate file with update packages, and to upload the file to the update store 323 from the generator 309. A parsed update package list may display the update packages available and may prompt the user to select the desired packages to add to the update store 323. The system may indicate packages that are a duplicate of current unapproved update packages, and that may be replaced. The system may also indicate whether packages are duplicates of approved update packages, which may not be replaced. The management console 311 may then transfer the selected update packages to the update store 323 and catalog them according to the metadata, which may be provided through an XML schema. Upon upload to the update store 323, the update packages may be put in the default state of "new," at which point the packages may not be accessed by any devices in the system. In an embodiment of the present invention, the "test" state may be a quarantined status where only selected devices may gain access to the update packages for test. Access to update packages may be granted based on a unique device identification, which may be sent during the initial capabilities exchange during the update retrieval process. Once the administrator sets the state of an update package to "approved," the updates package may be made available to all devices whose metadata matches that of the update package.

In an embodiment of the present invention, an update process may begin when an end-user initiates the download agent. In another embodiment of the present invention, an update process may begin when an administrator publishes and sends notification to applicable mobile handsets about the availability of updates to software/firmware in the mobile handset. The download agent in the mobile handset 307 may detect and validate the notification, and may be remotely triggered by the notification. In an embodiment of the present invention, the download agent may use the display of the mobile handset to indicate to the end-user that an update is available, and may prompt the user to accept or decline the update. The user may then accept, and the download agent may contact the device server 315 and pass metadata describing the mobile handset (device attributes) to the device server 315 in an appropriate format such as, for example, XML format. The device server 315 may then parse the metadata and query the update store 323 using the data. The update store 323 may then identify the appropriate update package based on the device parameters and return the update package metadata to the mobile handset 307. The download agent may then verify, using the update package metadata, that the update package the device server 315 is valid for the specific mobile handset. If the downloaded metadata is verified, the download agent may request the update package from the update store 323, through the device server 315. In an embodiment of the present invention, the end-user may be notified on the display of the mobile handset regarding the progress of the download.

When an update package is downloaded, the download agent may calculate a CRC on the update package, and may verify that it matches a CRC previously sent by the device server. If there is a match, the download agent may commit the update package to flash memory, write a status flag to flash memory indicating availability of the update package, and reset the mobile handset. After reset, the update agent may update the firmware using the downloaded update package. In an embodiment of the present invention, the update agent may verify that the updated version of the firmware is the desired version, and that the update process executed properly.

In an embodiment of the present invention, the download agent may check for adequate available memory, prior to the downloading of an update package. If there is not enough memory to perform the update process, a message may be displayed on the mobile handset indicating to the end-user to take an appropriate action such as, for example, free memory resources, call customer care, bring the handset in to a retail service center, etc.

In an embodiment of the present invention, the status flag may be returned to idle state, upon completion of an update, and the mobile handset may be reset. At boot-up, the status flag may indicate that there has been an update and a notification may be generated and returned to the device server for logging and billing purposes. The mobile handset may be then operated in a normal operating mode with an updated firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that supports deployment of updating information used for the updating of firmware in an electronic device, through a network, the system comprising:
   a generator for generating updating information using two versions of the firmware;
   storage having database software for storing the updating information and an associated lifecycle state value that holds one of a plurality of values representing states in a lifecycle of the updating information, the plurality of values comprising at least a value assigned to new updating information that has not been successfully tested for use in the electronic device;
   a user interface at least for managing the generation, distribution, and storage of the updating information and for one or both of assigning and/or checking the lifecycle state value associated with stored updating information; and
   wherein the lifecycle state value associated with the stored updating information is accessed to determine permissible deployment of the updating information by the system, wherein the deployment of the updating information by the system is restricted when the lifecycle state value is set at the value assigned to new updating information that has not been successfully tested for use in the electronic device.

2. The system according to claim 1 wherein the electronic device comprises:
   loader software for loading updating information from the storage; and
   updating software for applying loaded updating information to the firmware in the electronic device.

3. The system according to claim 2 wherein the storage verifies the updating information before allowing the loader software to load the updating information.

4. The system according to claim 3 wherein the verifying includes at least one of the following:
   at least one characteristic associated with the updating information; and
   data calculated using the updating information.

5. The system according to claim 2 wherein the loader software verifies the loaded updating information before allowing the updating software to apply the updating information.

6. The system according to claim 2 wherein the electronic device further comprises software that determines whether the electronic device has a sufficient power level for loading updating information from the storage.

7. The system according to claim 2 wherein the electronic device further comprises software that determines whether the electronic device has sufficient free memory for loading updating information from the storage.

8. The system according to claim 1 wherein an authorized user uses the user interface to manage the generated updating information.

9. The system according to claim 8 wherein only an authorized user can load the generated updating information to the storage.

10. The system according to claim 8 wherein a plurality of distinct updating information reside in the storage, and wherein only an authorized user determines which one of the plurality of the distinct updating information is appropriate for the electronic device.

11. The system according to claim 8 wherein the associated lifecycle state value is one of:
    a first state value indicating the generated updating information is new and untested;
    a second state value indicating the generated updating information is only available to an authorized user;
    a third state value indicating the generated updating information is available to be loaded by an electronic device of a network subscriber;
    a fourth state value indicating the generated updating information is no longer valid; and
    a fifth state value indicating the generated updating information failed testing performed by an authorized user.

12. The system according to claim 11 wherein only an authorized user can change the associated lifecycle state value of updating information.

13. The system according to claim 1 wherein the network comprises at least one server communicatively coupled to at least one electronic device, and the at least one server distributes the updating information to the at least one electronic device.

14. The system according to claim 1 wherein the network is wireless.

15. The system according to claim 1 wherein the electronic device is portable.

16. The system according to claim 1 wherein the generator utilizes optimizing algorithms to minimize the size of the updating information.

17. The system according to claim 1 wherein at least a portion of the system is integrated into an existing framework.

18. The system according to claim 17 wherein components of the existing framework are used to facilitate the updating of firmware in the electronic device using the generated updating information.

19. A method of operating a system that supports deployment of updating information used for the updating of firmware in at least one electronic device, the method comprising:
    generating updating information using a first version of the firmware and a second version of the firmware;
    storing the generated updating information;
    storing a lifecycle state value associated with the generated updating information, wherein the lifecycle state value holds one of a plurality of values representing states in a lifecycle of the updating information, the plurality of values comprising at least a value assigned to new updating information that has not been successfully tested for use in the electronic device; and
    communicating a notification to the at least one electronic device about the availability of updating information, based upon the lifecycle state value associated with the updating information, wherein the availability of the updating information is restricted if the lifecycle state value is the value assigned to new updating information that has not been successfully tested for use in the electronic device.

20. The method according to claim 19 wherein the plurality of values comprises:
- a first state value indicating the generated updating information is new;
- a second state value indicating the generated updating information is only available to an authorized user;
- a third state value indicating the generated updating information is available to be loaded by the least one electronic device;
- a fourth state value indicating the generated updating information is no longer valid; and
- a fifth state value indicating the generated updating information failed testing performed by an authorized user.

21. The method according to claim 19 wherein the method further comprises:
- receiving a request for the updating information from the at least one electronic device;
- retrieving the updating information using at least one characteristic of the at least one electronic device; and
- verifying the retrieved updating information.

22. The method according to claim 21 wherein the method further comprises sending the updating information to the at least one electronic device.

23. The method according to claim 22 wherein the method further comprises receiving a notification from the at least one electronic device indicating a successful updating of the firmware in the at least one electronic device.

24. The method according to claim 19 wherein the communicating is done over a wireless channel.

* * * * *

UNITED STATES PATENT AND TRADEMARK OFFICE
CERTIFICATE OF CORRECTION

| | |
|---|---|
| PATENT NO. | : 7,480,907 B1 |
| APPLICATION NO. | : 10/754313 |
| DATED | : January 20, 2009 |
| INVENTOR(S) | : Sunil Marolia et al. |

It is certified that error appears in the above-identified patent and that said Letters Patent is hereby corrected as shown below:

In column 8, line 49, after "algorithm-based" delete "DES".

Signed and Sealed this

Twenty-third Day of June, 2009

JOHN DOLL
*Acting Director of the United States Patent and Trademark Office*